US007135128B2

(12) United States Patent
Hippold et al.

(10) Patent No.: US 7,135,128 B2
(45) Date of Patent: Nov. 14, 2006

(54) POLYURETHANE COMPOSITIONS WITH A LOW CONTENT OF DIISOCYANATE MONOMER(S)

(75) Inventors: Theodor Hippold, Bad Salzuflen (DE); Dieter Guse, Löhne (DE); Christian Terfloth, Detmold (DE)

(73) Assignee: Jowat AG, Detmold (DE)

( * ) Notice: Subject to any disclaimer, the term of this patent is extended or adjusted under 35 U.S.C. 154(b) by 60 days.

(21) Appl. No.: 10/371,445

(22) Filed: Feb. 21, 2003

(65) Prior Publication Data

US 2003/0162933 A1   Aug. 28, 2003

(30) Foreign Application Priority Data

Feb. 22, 2002   (DE) ................ 102 07 571
Apr. 9, 2002   (DE) ................ 102 15 641
Jun. 11, 2002   (DE) ................ 102 25 982

(51) Int. Cl.
*C07C 269/02*   (2006.01)
*C07C 271/06*   (2006.01)
*C07C 271/08*   (2006.01)
*C08G 18/10*   (2006.01)
*C08G 18/40*   (2006.01)

(52) U.S. Cl. .............. 252/182.22; 528/59; 528/60; 528/61; 528/65; 528/66; 528/67; 528/76; 528/80; 528/85; 560/25; 560/26; 560/115; 560/158

(58) Field of Classification Search .......... 252/182.22; 528/59, 60, 61, 65, 66, 67, 76, 80, 85; 560/25, 560/26, 115, 158

See application file for complete search history.

(56) References Cited

U.S. PATENT DOCUMENTS

| 4,385,171 | A | | 5/1983 | Schnabel et al. |
| 4,487,910 | A | * | 12/1984 | Bauriedel ................... 528/65 |
| 4,888,124 | A | | 12/1989 | Blum et al. |
| 5,166,302 | A | | 11/1992 | Werner et al. |
| 5,747,628 | A | * | 5/1998 | Schmalstieg et al. ......... 528/60 |
| 5,998,538 | A | | 12/1999 | Meckel et al. |
| 6,114,402 | A | | 9/2000 | Smith |
| 6,280,561 | B1 | | 8/2001 | McInnis et al. |
| 6,376,567 | B1 | | 4/2002 | Werner et al. |
| 6,465,104 | B1 | | 10/2002 | Krebs et al. |
| 6,515,164 | B1 | | 2/2003 | Bolte et al. |
| 6,686,415 | B1 | | 2/2004 | Terfloth et al. |
| 2002/0058751 | A1 | | 5/2002 | Williams |
| 2003/0024639 | A1 | | 2/2003 | Paulsen et al. |
| 2004/0084138 | A1 | | 5/2004 | Henke et al. |

FOREIGN PATENT DOCUMENTS

| DE | 2917314 | 9/1980 |
| DE | 19504007 | 8/1996 |
| DE | 19851182 | 5/1999 |
| DE | 19931997 | 1/2000 |
| DE | 10030908 | 2/2001 |
| DE | 19959653 | 6/2001 |
| DE | 19957351 | 10/2001 |
| DE | 10150722 | 4/2003 |
| EP | 0922720 | 6/1999 |
| WO | WO0140342 | 6/2001 |

\* cited by examiner

*Primary Examiner*—Rabon Sergent
(74) *Attorney, Agent, or Firm*—Cohen, Pontani, Lieberman & Pavane

(57) ABSTRACT

At least one isocyanate-reactive monomer is reacted with an excess of molten monomeric diisocynate to produce at least one reaction product and a maximum of 0.5 wt % of free isocyanate groups. The reaction product is then mixed with at least 20 wt. %, based on the total weight of reaction product, of at least one isocyanate-terminated prepolymer which is essentially free of diisocyanate monomers and has a viscosity at 20° C. of at least 1.500 mPa·s, the isocyanate-terminated prepolymer having a content of free NCO groups of up to 25 wt % and containing a maximum of 0.1 wt. % of diisocyanate monomer(s) based on the weight of the isocyanate-terminated prepolymer. A polyurethane composition containing less than 0.1 wt. % of monomeric diisocyanate, based on the total weight of the resulting polyurethane composition, is produced.

15 Claims, No Drawings

POLYURETHANE COMPOSITIONS WITH A LOW CONTENT OF DIISOCYANATE MONOMER(S)

BACKGROUND OF THE INVENTION

1. Field of the Invention

The present invention concerns a process for producing polyurethane compositions with a low content of diisocyanate monomer(s), the polyurethane compositions that can be produced by this process, and their use, especially in bonding processes (e.g., in hot-melt bonding processes) or for coating purposes. The invention also concerns adhesives and coating compounds that contain polyurethane compositions of this type.

2. Description of the Related Art

Many different processes for producing polyurethane compositions are known. However, these processes usually involve more than two process steps. The more complex the process and the greater the number of components, the more expensive and susceptible to error the process becomes.

There are a huge number of polyurethane compositions. In industrial applications, they are generally adjusted to specific applications according to user specifications, and in this regard, especially moisture-reactive polyurethane compositions are used as hot-melt adhesives.

However, the use of these polyurethane compositions is not without its problems, because the diisocyanate monomers they contain are toxic, injurious to health, irritating, and sensitizing. This means that during the processing of polyurethane compositions, care must be taken to ensure that the maximum allowable concentration (MAC) of the isocyanates, which depends on their vapor pressures, is not exceeded. The MAC Commission has even classified various monomeric isocyanates in Category 3 "Substances with Well-Founded Suspicion of Carcinogenic Potential" of Section III (Carcinogenic Workplace Substances) of the MAC List. The Trade Association of the German Chemical Industry published a special code of practice entitled "Polyurethane Production and Processing/Isocyanates" with information on the safe handling of isocyanates. According to this publication, the handling of monomeric diisocyanates and compositions that contain monomeric diisocyanates requires special care, and according to the provisions of the Hazardous Substances Act, monomeric diisocyanates and compositions that contain diisocyanates must be labeled accordingly. However, when the content of monomeric diisocyanates in the composition is very low (less than 0.1 wt. %), there may no longer be an obligation to provide hazardous substance labeling.

DE 199 57 351 A1 describes the production of a reactive polyurethane adhesive/sealant composition with a low content of isocyanate monomers, in which a diol component is reacted with a monomeric diisocyanate, the unreacted monomeric diisocyanate is removed from the reaction product by recrystallization and/or washing with an aprotic solvent, and the high-molecular-weight diisocyanate formed in this way is reacted with a polyol. This process has the disadvantage that the excess monomeric diisocyanate must be removed to obtain a low content of monomeric diisocyanate in the polyurethane composition.

DE 199 31 997 A1 describes a polyurethane binder with a low content of readily volatile residual monomers and improved slip agent adhesion and a multistep process for producing it. Various difunctional isocyanates and polyol components are used in the multistep process. This makes the process very expensive and subject to error, since the various components must be used in the production process at precisely the right times and in precisely the right amounts.

Therefore, one of the goals of the invention is to develop a process for producing a polyurethane composition with a low content of diisocyanate monomer(s).

Another goal of the present invention is to make available a polyurethane composition with a low content of diisocyanate monomer(s), which can be used in a bonding process or for coating purposes.

SUMMARY OF THE INVENTION

First Embodiment:

In accordance with a first embodiment, the object of the invention is thus a process for producing a polyurethane composition with a low content of diisocyanate monomer(s), in which, in a first process step (a), at least one isocyanate-reactive polymer is reacted with at least one monomeric diisocyanate, and then, in a second process step (b), the reaction product or products obtained in step (a) are mixed with at least one isocyanate-terminated prepolymer, which is essentially free of diisocyanate monomers, in such a way that the resulting total composition contains less than 0.1 wt. % of monomeric diisocyanate.

The first embodiment of the process of the invention has the advantage that the health-endangering monomeric diisocyanates are used only in the first step, in which, however, they are reacted with at least one isocyanate-reactive polymer, so that, during the subsequent mixing of the reaction product with an isocyanate-terminated prepolymer, there is no need to use monomeric diisocyanates, while at the same time the polyurethane composition does not lose any of its reactivity or quality. In this way, the process described above results in a polyurethane composition that requires no labeling in accordance with the Hazardous Substances Act.

In the first step of the process, a single reaction product or several different reaction products may be formed, so the term "reaction product", as used here, includes both the singular and the plural. With respect to the diisocyanate used in the first step of the process, the term "diisocyanate" used here likewise includes both the singular and plural.

Preferably, the isocyanate-reactive polymer has at least two isocyanate-reactive groups, preferably isocyanate-reactive H-atoms, per molecule, and that, in particular, the isocyanate-reactive polymer may contain hydroxyl, amino, carboxyl, carboxylic acid anhydride, mercapto, silyl, and/or carbonamide groups.

Preferably, the isocyanate-reactive polymer is reacted with the monomeric diisocyanate in step (a) in the molten state, especially at temperatures of 50–160° C., and preferably 100–150° C., and/or that the isocyanate-reactive polymer is reacted with the monomeric diisocyanate in step (a) in the presence of a slight excess of diisocyanate, especially such that the reaction in step (a) is carried out in such a way that a maximum of 0.5 wt. % of free isocyanate groups are present in the mixture after step (a) has been carried out.

The isocyanate-reactive polymer preferably has an average molecular weight of more than 1,000 g/mole, especially 2,000 to 8,000 g/mole, and preferably 2,000 to 5,000 g/mole, and/or that the isocyanate-reactive polymer is derived from isocyanate-reactive polymers and/or copolymers, and/or that the isocyanate-reactive polymer is selected, in particular, from the group comprising isocyanate-reactive polyesters, polycaprolactone polyesters, polyethers, polyurethanes, polyamides, polytetrahydrofurans, polyacrylates, and polymethacrylates and their copolymers and mixtures, each with isocyanate-reactive groups, especially hydroxyl groups, and/or that the isocyanate-reactive polymer is selected from the group comprising hydroxyl-functionalized polymers, especially hydroxyl-functionalized polyesters and/or hydroxyl-functionalized polyethers, preferably with at least two hydroxyl groups per molecule.

The monomeric diisocyanate is preferably an aliphatic and/or aromatic diisocyanate, especially with free terminal NCO groups, especially such that the diisocyanate may be selected from the group comprising diphenylmethane diisocyanates (MDI), especially diphenylmethane-4,4'-diisocyanate and diphenylmethane-2,4'-diisocyanate, and mixtures of different diphenylmethane diisocyanates; 1,5-naphthalene diisocyanate (NDI); toluene diisocyanates (TDI), especially 2,4-toluene diisocyanate, as well as TDI-urethdiones, especially dimeric 1-methyl-2,4-phenylene diisocyanate (TDI-U), and TDI-ureas; 1-isocyanato-3-isocyanatomethyl-3,5,5-trimethylcyclohexane (IPDI) and its isomers and derivatives, especially dimers, trimers, and polymers, and IPDI-isocyanurate (IPDI-T); 3,3'-dimethylbiphenyl-4,4'-diisocyanate (TODI); 3,3'-diisocyanato-4,4'-dimethyl-N,N'-diphenylurea (TDIH); and mixtures and prepolymers of the compounds enumerated above.

In accordance with the invention, a mixture of diphenylmethane-4,4'-diisocyanate and diphenylmethane-2,4'-diisocyanate is an example of a suitable diisocyanate component, preferably with a content of diphenylmethane-2,4'-diisocyanate greater than 20 wt. %, especially greater than 30 wt. %, more preferably greater than 40 wt. %, and most preferably greater than 50 wt. %, based on the [total weight of the] diisocyanate mixture. Examples of mixtures of diphenylmethane-4,4'-diisocyanate and diphenylmethane-2,4'-diisocyanate that are suitable in accordance with the invention are the product mixture sold by Bayer AG under the trade name Desmodur® 2460 M and the product mixture sold by Elastogran GmbH, Lemförde, under the trade name Lupranate® MI, both of which are liquid at room temperature.

The use of unsymmetrically substituted diisocyanates with NCO groups of differing reactivity, such as, especially, diphenylmethane-2,4'-diisocyanate, has the advantage that the NCO group in the 2-position—in contrast to the NCO group in the 4'-position—is relatively slow to react and therefore is present in stable form for an extended period of time in the polyurethane composition in accordance with the invention. In general, therefore, it is desirable to use unsymmetrically substituted diisocyanates with two NCO groups of differing reactivity. An example of a suitable diphenylmethane-2,4'-diisocyanate is the product sold by Elastogran GmbH, Lemförde, under the trade name Lupranate® MCI, which exists as a crystalline solid at room temperature.

In accordance with another modification of the present invention with respect to the first embodiment of the process of the invention, the diisocyanate that is used may be a masked or blocked diisocyanate, which splits off the blocking or masking groups, especially by the action of heat and/or moisture. One of ordinary skill in the art is already familiar with blocked or masked diisocyanates of this type from the state of the art and will select suitable blocked or masked diisocyanates according to the specific application.

In accordance with another modification of the present invention with respect to the first embodiment of the process of the invention, the diisocyanate that is used may also be a so-called encapsulated or surface-deactivated diisocyanate, i.e., a diisocyanate with delayed reactivity. The expert is already familiar with encapsulated or surface-deactivated diisocyanates from the state of the art. Reference may be made, for example, to EP 0 204 970 A2 or the corresponding document U.S. Pat. No. 4,888,124, WO 99/58590 A1, or the corresponding document DE 198 20 270 A1, or to EP 0 922 720 A1, the entire disclosed content of which is herewith incorporated by reference. Compounds that may be used as deactivating agents include especially compounds with hydrophilic groups, such as, especially, amino groups or hydroxyl groups, which are able to react with the free isocyanate groups of the diisocyanate and thus form a sort of surface covering on the diisocyanates, which initially deactivates the diisocyanates (e.g., amines, diamines, polyamines, alcohols, diols, polyols, or the corresponding thio compounds). In particular, in accordance with the present invention, the type and amount of the deactivating agent are selected in such a way that the encapsulation or surface deactivation preferably breaks down at temperatures above room temperature.

In addition, the reaction of the isocyanate-reactive polymer with the monomeric diisocyanate in step (a) of the process of the invention can be carried out in the presence of at least one catalyst and possibly in the presence of components that do not react with an isocyanate, such as polymers, resins, waxes, fillers, additives, and/or solvents that are unreactive towards isocyanates and which are preferably homogeneously distributed in or mixed with the reaction product(s) and/or the isocyanate-terminated prepolymer. Catalysts that are well known and well established in polyurethane chemistry are suitable catalysts for use in accordance with the invention namely, organotin compounds, such as dibutyltin dilaurate (DBTL) and alkyl mercaptide compounds of dibutyltin, or organic iron, lead, cobalt, bismuth, antimony or zinc compounds, and mixtures of these compounds, as well as amine-based catalysts, such as tertiary amines, 1,4-diazabicyclo[2.2.2]octane and dimorpholinodiethyl ether and their mixtures, especially such that the catalyst concentration is 0.01 to 5 wt. %, based on the total weight of the polyurethane composition.

Resins that do not react with isocyanates are selected from the group of aliphatic, cyclic, or alicyclic hydrocarbon resins, terpene-phenol resins, coumarone-indene resins, α-methylstyrene resins, polymerized tall resin esters, or ketone-aldehyde resins, especially such that the resins may have a low acid value, preferably less than 1 mg KOH/g. Polymers that do not react with isocyanates are selected from the group comprising: (i) ethylene-vinyl acetate polymers or copolymers, especially those with vinyl acetate contents of 12–40 wt. %, especially 18–28 wt. %, and/or with melt-flow indexes (MFI, DIN 53735) of 8–800, and especially 150–500; (ii) polyolefins, especially with average molecular weights of 5,000 to 25,000 g/mole, and preferably 10,000 to 20,000 g/mole, and/or with softening ranges by the ball-and-ring test of 80–170° C., and preferably 80–130° C.; and (iii) (meth)acrylates, such as styrene-(meth)acrylates and mixtures of these compounds. Waxes that do not react with isocyanates are selected from the group comprising polyolefin waxes, especially polyethylene and polypropylene waxes, and modified waxes based on these compounds.

In the second process step (b), the reaction product obtained in the first process step (a) is mixed with an essentially monomer-free, isocyanate-terminated prepolymer. The expression "essentially monomer-free" means that the isocyanate-terminated prepolymer contains a maximum of 0.1 wt. % of diisocyanate monomer and preferably contains no diisocyanate monomer. The isocyanate-terminated prepolymer in step (b) can be obtained by reaction of a diisocyanate or polyisocyanate with at least one isocyanate-reactive polymer, followed by removal of the unreacted diisocyanate or polyisocyanate, preferably by evaporation/volatilization of the unreacted diisocyanate or polyisocyanate, or by stripping with monofunctional or difunctional isocyanate-reactive additives, such as amines, alcohols, or mercaptans.

The viscosity of the isocyanate-terminated prepolymer at 20° C. is preferably at least 1,500 mPa·s, especially at least 3,000 mPa·s, more preferably at least 8,000 mPa·s, and most preferably at least 10,000 mPa·s. The isocyanate-terminated prepolymer preferably has a content of free NCO groups of up to 3 wt. %, especially up to 5 wt. %, preferably up to 10 wt. %, and more preferably up to 25 wt. %. The isocyanate-terminated prepolymer is preferably selected from the group comprising MDI prepolymers, TDI prepolymers, and MDI/TDI prepolymers.

Preferably, the reaction product(s) obtained in step (a) are mixed with at least 20 wt. %, especially at least 25 wt. %, and preferably at least 30 wt. % of the monomer-free isocyanate-terminated prepolymer, based on the total weight of the reaction product.

The composition produced by the presently claimed process preferably contains at least 1 wt. % of free NCO groups, especially at least 2 wt. %, and preferably at least 3 wt. % or more, based on the total weight of the composition obtained in step (b), such that, of this amount, a maximum of 0.1 wt. % is made available by monomeric diisocyanate.

Monomer-free, isocyanate-terminated prepolymers that are suitable in accordance with the invention are derived, for example, from MDI's and/or TDI's. Examples of monomer-free, isocyanate-terminated prepolymers that are suitable in accordance with the invention and that are free of labeling in accordance with the Hazardous Substances Act due to their low residual monomer content, are the products sold by Dow Chemical under the trade name "Vorastar®" (e.g., Vorastar® 1500, Vorastar® 1505, Voramer® 1022, and Voramer® 1020) and the product sold by Bayer AG under the trade name "Desmodur® VPKA 8697".

The object of the present invention is also a polyurethane composition that can be produced by the first embodiment of the process of the invention. For further details, especially additional advantageous modifications and refinements with respect to the polyurethane composition produced by the first embodiment of the process, see the patent claims and the preceding discussion of the process.

An additional object of the present invention is the use of this polyurethane composition produced by the first embodiment of the process in a bonding process, especially a hot-melt adhesive bonding process, and its use for coating purposes.

Still another object of the present invention is adhesives and coating compounds that contain this polyurethane composition produced by the first embodiment of the process of the invention.

Second Embodiment:

In accordance with a second embodiment, the object of the invention is thus a process for producing a polyurethane composition with a low content of diisocyanate monomer(s), in which at least one isocyanate-reactive polymer is reacted with at least one isocyanate-terminated prepolymer, which is essentially free of diisocyanate monomer(s).

The second embodiment of the process of the invention has the decided advantage that health-endangering monomeric diisocyanates are not used at all and may be present in the isocyanate-terminated prepolymer that is used as one of the feedstocks at most as a slight impurity derived from its production process. In other words, the process of the invention makes it possible to dispense entirely with the use of monomeric diisocyanates as feedstocks in the production of polyurethane compositions, while at the same time the polyurethane compositions do not lose any of their reactivity or quality. In this way, the second embodiment of the process described above results in polyurethane compositions that require no labeling in accordance with the Hazardous Substances Act.

Depending on the feedstocks that are used, a single reaction product or several different reaction products may be formed during the reaction, so the term "reaction product", as used here, includes both the singular and the plural.

The reaction of the isocyanate-reactive polymer with the isocyanate-terminated prepolymer may be carried out in the presence of at least one catalyst and/or in the presence of components that do not react with isocyanates, such as polymers, resins, waxes, fillers, additives and/or solvents, etc., that are unreactive towards isocyanates. Catalysts that are well known and well established in polyurethane chemistry are suitable catalysts for use in accordance with the invention. Appropriate catalysts and unreactive components have been discussed above in reference to the first embodiment.

The isocyanate-reactive polymer used in accordance with the invention is preferably those described above in the first embodiment.

The isocyanate-terminated prepolymer used in accordance with the invention is essentially free of diisocyanate monomer(s) or monomeric diisocyanate(s) and therefore is synonymously called "essentially monomer-free" in the present invention. The expression "essentially monomer-free" means, specifically, that the isocyanate-terminated prepolymer contains less than 0.1 wt. % of diisocyanate monomer(s) and, very preferably, is completely free of diisocyanate monomer(s). A manner of producing such isocyanate-terminated prepolymer, as well as the preferred characteristics of the prepolymer, are discussed above in the first embodiment of the invention.

The reaction of the isocyanate-reactive polymer with the isocyanate-terminated prepolymer is preferably carried out in the molten state, especially at temperatures of 50–160° C., and preferably 100–150° C., and/or that the reaction is carried out in such a way that the resulting polyurethane composition contains less than 0.1 wt. % of monomeric diisocyanate(s), based on the total weight of the composition, and/or that the content of monomeric diisocyanate(s) in the resulting polyurethane composition is adjusted by the selection of the isocyanate-terminated prepolymer that is used and especially by controlling the content of monomeric diisocyanate(s) in the isocyanate-terminated prepolymer that is used.

The reaction of the isocyanate-reactive polymer with the isocyanate-terminated prepolymer is preferably carried out in the presence of an excess of isocyanate-terminated prepolymer.

In accordance with the present invention, particularly those essentially monomer-free, isocyanate-terminated prepolymers that have the greatest possible content of NCO groups are especially preferred as feedstocks for the reaction with the isocyanate-reactive polymers. First of all, this offers the possibility of quasi-tailoring the end products, i.e., the resulting polyurethane compositions, especially with respect to the selection of the type and/or amount of the isocyanate-reactive polymer. The more NCO groups the essentially monomer-free, isocyanate-terminated prepolymer contains, the more linkage points or reaction centers are present for the isocyanate-reactive polymer, by means of which the properties of the reaction product(s) can be systematically controlled or affected. In addition, when the isocyanate-terminated prepolymer has the greatest possible content of NCO groups, this generally leads to end products or reaction products, i.e., the polyurethane compositions of the invention, with a high proportion or concentration of free NCO groups (generally at least 0.5, 1, 2 or 3 wt. %, especially 0.5 to 5 wt. %, and preferably 0.5 to 3 wt. % of free NCO groups), which, for example, are especially well suited for bonding and/or coating purposes.

Monomer-free, isocyanate-terminated prepolymers that are suitable in accordance with the invention are derived, for example, from MDI's and/or TDI's. Examples of commercially available, monomer-free, isocyanate-terminated prepolymers that are suitable in accordance with the invention, and that are free of labeling in accordance with the Hazardous Substances Act due to their low residual monomer content, include the various products sold by Dow Chemical under the trade name "Vorastar®" (=isocyanate-terminated prepolymers), e.g., Vorastar® 1500, Vorastar® 1505, Voramer® 1022, and Voramer® 1020, and the product sold by Bayer AG under the trade name "Desmodur® VP KA 8697".

In a special modification of the second embodiment of the process of the invention, after the reaction of the isocyanate-reactive polymer with the isocyanate-terminated prepolymer, additional isocyanate-terminated prepolymer may possibly be added to the reaction product(s). In other words, the polyurethane composition obtained by reaction of the isocyanate-reactive polymer with the isocyanate-terminated prepolymer may be diluted by the addition of additional isocyanate-terminated prepolymer. This may be desirable especially when, for example, one wishes to adjust the theological properties of the polyurethane composition in some desired way, and/or when one wishes to adjust the concentration of free NCO groups in the polyurethane composition to a certain value. However, this step is optional.

A polyurethane composition that can be produced by the second embodiment of the process of the invention is likewise an object of the present invention. For further details, especially additional advantageous modifications and refinements with respect to the polyurethane composition produced by the second embodiment of the process, see the patent claims and the preceding discussion of the process.

An additional object of the present invention is the use of this polyurethane composition produced by the second embodiment of the process in a bonding process, especially a hot-melt adhesive bonding process, and its use for coating purposes.

Still another object of the present invention is adhesives and coating compounds that contain this polyurethane composition produced by the second embodiment of the process of the invention.

Additional modifications, refinements, and variations of the invention and additional advantages of the invention are immediately apparent to an expert in this field upon reading the Specification and can be realized by him without his exceeding the bounds of the present invention.

The present invention is illustrated by but not limited to the following specific embodiments.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Example 1

Example in Accordance with the First Embodiment of the Process

Moisture-crosslinking, monomer-free, labeling-free polyurethane compositions produced by the first embodiment of the process of the present invention.

Hydroxyl-functionalized polyesters and components that do not react with isocyanates (polymers, resins, fillers, additives) are reacted with monomeric isocyanates (aromatic or aliphatic) in such a way that only a small excess of isocyanate groups (NCO groups) is present (max. 0.5%). With this mixing ratio, the viscosity usually rises so sharply that the material can no longer be handled as a hot-melt adhesive. If, however, after the isocyanate monomers are added, a monomer-free isocyanate prepolymer, which was demonomerized during its production, is then added, a low-viscosity hot-melt adhesive is obtained that now contains only a small amount of monomeric isocyanates.

Carrying Out the Process:
- 37.5 g of polyester 1 Dynacoll® 7250 (Degussa AG) (hydroxyl value: 21 mg KOH/g);
- 37.5 g of polyester 2 Dynacoll® 7360 (Degussa AG) (hydroxyl value: 32 mg KOH/g); and
- 25.0 g of the resin Novarez® TM 80 (VFT AG) are reacted with 5.98 g of the diisocyanate Lupranate® MCI (Elastogran) (33.6% NCO) in the molten state at 140–150° C. The theoretical isocyanate content is 0.49%.

The whole resulting product is then diluted with 31.8 g of the monomer-free isocyanate prepolymer Vorastar® B150 0 (Dow) (NCO content 3.0%).

A low-viscosity polyurethane composition in accordance with the present invention is obtained, which contains less than 0.1% monomeric diisocyanate (MDI) and is especially suitable as a hot-melt adhesive.

Example 2

Example in Accordance with the Second Embodiment of the Process

Moisture-crosslinking, monomer-free, labeling-free polyurethane compositions produced by the second embodiment of the process of the present invention Isocyanate-reactive polymers (hydroxyl-functionalized polyesters) and components that do not react with isocyanates (polymers, resins, fillers, additives) are reacted in the molten state with essentially monomer-free, isocyanate-terminated prepolymers (content of diisocyanate monomers <0.1 wt. %). The resulting polyurethane compositions contain less than 0.1 wt. % of diisocyanate monomers and at least 0.5 wt. % of free NCO groups, in each case, based on the total [weight of the] compositions. The resulting relatively low-viscosity polyurethane compositions are especially suitable for use as hot-melt adhesives or coating materials.

Carrying Out the Process:

37.5 g of polyester 1 Dynacoll® 7250 (Degussa AG) (hydroxyl value: 21 mg KOH/g), and 37.5 g of polyester 2 Dynacoll® 7360 (Degussa AG) (hydroxyl value: 32 mg KOH/g), and 25.0 g of the resin Novarez® TM 80 (VFT AG) are reacted with 50.0 g of Desmodur® VPKA 8697 of Bayer AG, Leverkusen (TDI-based prepolymer, NCO content ca. 8.5%, monomer content <0.1%) in the molten state at 140–150° C. The theoretical isocyanate content is 1.8%.

The whole resulting product may then be diluted with additional Desmodur® VPKA 8697, especially if one wishes to establish a specific rheology. However, this step is optional.

A low-viscosity polyurethane composition in accordance with the present invention is obtained, which contains less than 0.1% monomeric diisocyanate (TDI) and is especially suitable as a hot-melt adhesive.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the process illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto All references cited herein are incorporated in their entirety.

We claim:

1. A process for producing a polyurethane composition with a low content of diisocyanate monomer(s) of less than 0.1 wt. %, based on the total weight of the resulting polyurethane composition, said process comprising:

a first process step (a), wherein at least one isocyanate-reactive polymer is reacted with at least one monomeric diisocyanate in the molten state, wherein the isocyanate-reactive polymer is reacted with the monomeric diisocyanate in the presence of an excess of diisocyanate such that a maximum of 0.5 wt % of free isocyanate groups are present in the mixture after step (a) has been carried out; and then a second process step (b), wherein the reaction product or products obtained in step (a) are then mixed with at least 20 wt. %, based on the total weight of the reaction product(s) obtained in step (a), of at least one isocyanate-terminated prepolymer, which is essentially free of diisocyanate monomers, and has a viscosity at 20° C. of at least 1,500 mPa·s, the isocyanate-terminated prepolymer having a content of free NCO groups of up to 25 wt % and containing a maximum of 0.1 wt. % of diisocyanate monomer(s) based on the weight of the isocyanate-terminated prepolymer, to thereby produce a polyurethane composition containing less than 0.1 wt. % of monomeric diisocyanate, based on the total weight of the resulting polyurethane composition.

2. The process according to claim 1, wherein the isocyanate-reactive polymer has at least two isocyanate-reactive groups.

3. The process according to claim 1 where the isocyanate-reactive polymer contains hydroxyl, amino, carboxyl, carboxylic acid anhydride, mercapto, silyl, or carbonamide groups.

4. The process according to claim 1, wherein the isocyanate-reactive polymer is selected from the group consisting of isocyanate-reactive polyesters, polycaprolactone polyesters, polyethers, polyurethanes, polyamides, polytetrahydrofurans, polyacrylates, and polymethacrylates and their copolymers and mixtures.

5. The process according to claim 1, wherein the isocyanate-reactive polymer is of hydroxyl-functionalized polymer selected from the group consisting of hydroxyl-functionalized polyesters and hydroxyl-functionalized polyethers.

6. The process in accordance with claim 1, wherein the monomeric diisocyanate is an aliphatic or aromatic diisocyanate.

7. The process in accordance with claim 1, wherein the monomeric diisocyanate is selected from the group consisting of diphenylmethane diisocyanates, 1,5-naphthalene diisocyanate, toluene diisocyanates, dimeric 1-methyl-2,4-phenylene diisocyanate, 1-isocyanato-3-isocyanatomethyl-3,5,5-trimethylcyclohexane, 1-isocyanato-3-isocyanatomethyl-3,5,5-trimethylcyclohexane-isocyanurate, 3,3'-dimethylbiphenyl-4,4'-diisocyanate, 3,3'-diisocyanato-4,4'-dimethyl-N,N'-diphenylurea, and mixtures thereof.

8. The process according to claim 1, wherein the reaction in step (a) is carried out in the presence of at least one catalyst.

9. The polyurethane composition produced by the process according to claim 1.

10. A process for producing a polyurethane composition with a content of diisocyanate monomer(s) of less than 0.1 wt. %, based on the total weight of the resulting polyurethane composition, said process comprising:

reacting at least one isocyanate-reactive polymer with at least one isocyanate-terminated prepolymer that is essentially free of diisocyanate monomers and has a viscosity at 20° C. of at least 1,500 mPa·s, the isocyanate-terminated prepolymer having a content of free NCO groups of up to 25 wt. % and containing a maximum of 0.1 wt. % of diisocyanate monomer(s) based on the weight of the isocyanate-terminated prepolymer, wherein the reaction of the isocyanate-reactive polymer with the isocyanate-terminated prepolymer is carried out in the molten state and in the presence of an excess of NCO groups made available by the isocyanate-terminated prepolymer, to thereby produce a polyurethane composition containing less than 0.1 wt. % of monomeric diisocyanate and containing at least 0.5 wt. % of free NCO groups, based on the total weight of the resulting polyurethane composition, adding an additional amount of said isocyanate-terminated prepolymer to said polyurethane composition.

11. The process according to claim 10, wherein the isocyanate-reactive polymer has at least two isocyanate-reactive groups.

12. The process according to claim 10 where the isocyanate-reactive polymer contains hydroxyl, amino, carboxyl, carboxylic acid anhydride, mercapto, silyl, or carbonamide groups.

13. The process according to claim 10, wherein the isocyanate-reactive polymer is of hydroxyl-functionalized polymer selected from the group consisting of hydroxyl-functionalized polyesters and hydroxyl-functionalized polyethers.

14. The process according to claim 10, wherein the reaction of the isocyanate-reactive polymer with the isocyanate-terminated prepolymer is carried out in the presence of at least one catalyst.

15. The polyurethane composition that is produced by the process according to claim 10.

* * * * *